July 20, 1943.                I. O. MINER                2,324,590
                    ELECTROMAGNETIC CLUTCH APPARATUS
                  Filed April 10, 1940        2 Sheets-Sheet 1

INVENTOR
IRVING O. MINER
BY
Maxwell Barus
ATTORNEY

July 20, 1943.  I. O. MINER  2,324,590
ELECTROMAGNETIC CLUTCH APPARATUS
Filed April 10, 1940  2 Sheets-Sheet 2
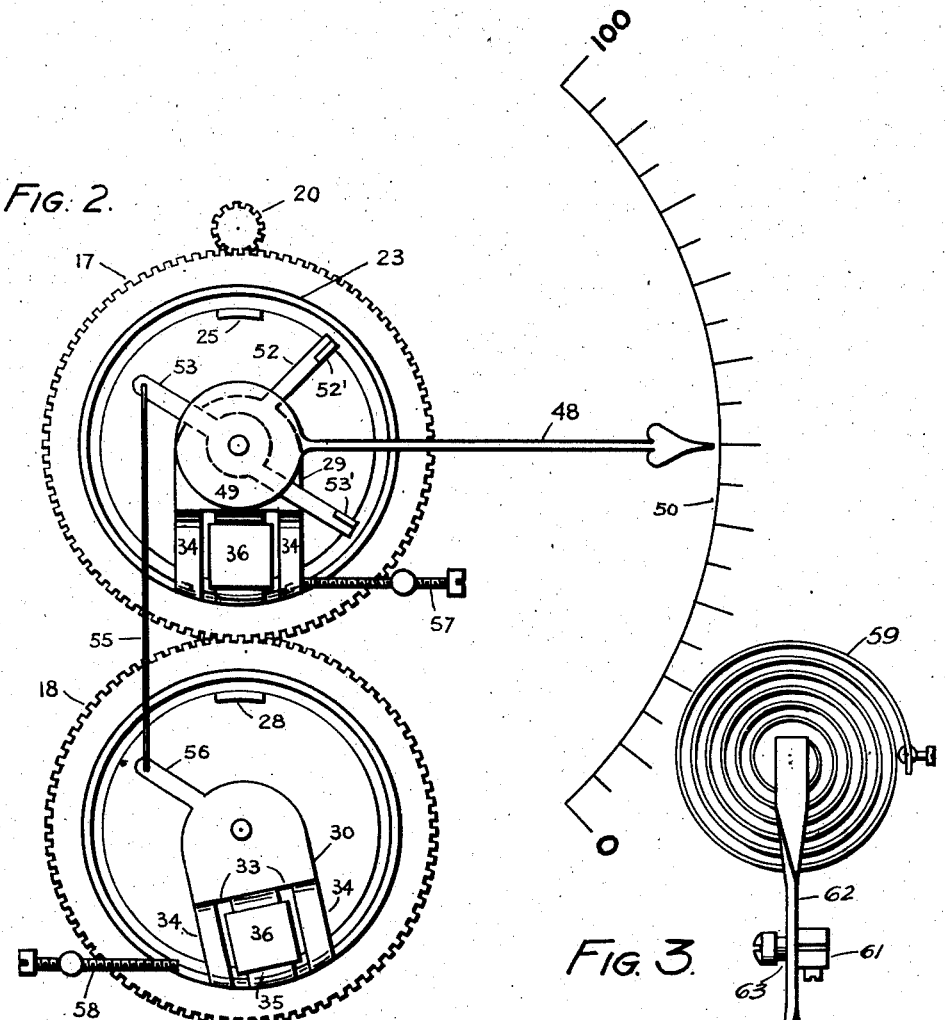
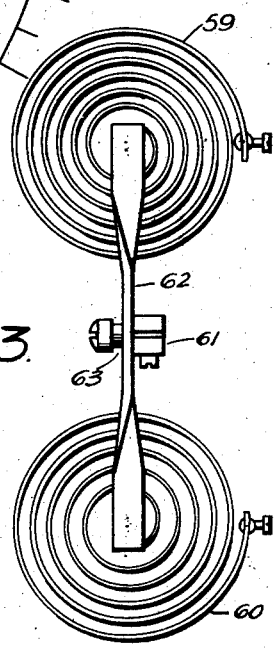
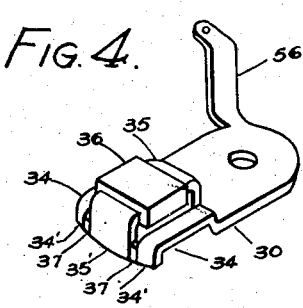
INVENTOR
*IRVING O. MINER*
BY
*Maxwell Barus*
ATTORNEY Patented July 20, 1943

2,324,590

UNITED STATES PATENT OFFICE 2,324,590

ELECTROMAGNETIC CLUTCH APPARATUS

Irving O. Miner, East Providence, R. I., assignor to Builders Iron Foundry, Providence, R. I., a corporation of Rhode Island Application April 10, 1940, Serial No. 328,834

5 Claims. (Cl. 192—84)

This invention relates to an electromagnetic clutch mechanism. An object is the provision of such a mechanism of simple and rugged construction which may be employed to distinct advantage with alternating currents.

An important feature of the invention resides in an electromagnetic clutch mechanism operable promptly and efficiently without objectionable vibration or "chattering," notwithstanding the employment of alternating current.

The invention has been developed in conjunction with a telemetric receiver apparatus having distinct advantages, and is accordingly illustrated as part of such apparatus.

The invention also comprises further features which will be hereinafter described and claimed.

In the accompanying drawings:

Fig. 2 is a front elevational view showing a portion of the apparatus illustrated in Figure 1.

Fig. 3 is a view in elevation of mechanism at the rear of the apparatus in Fig. 1.

Fig. 4 is a detail isometric view of the armature of one of the electromagnets.

Figure 1:
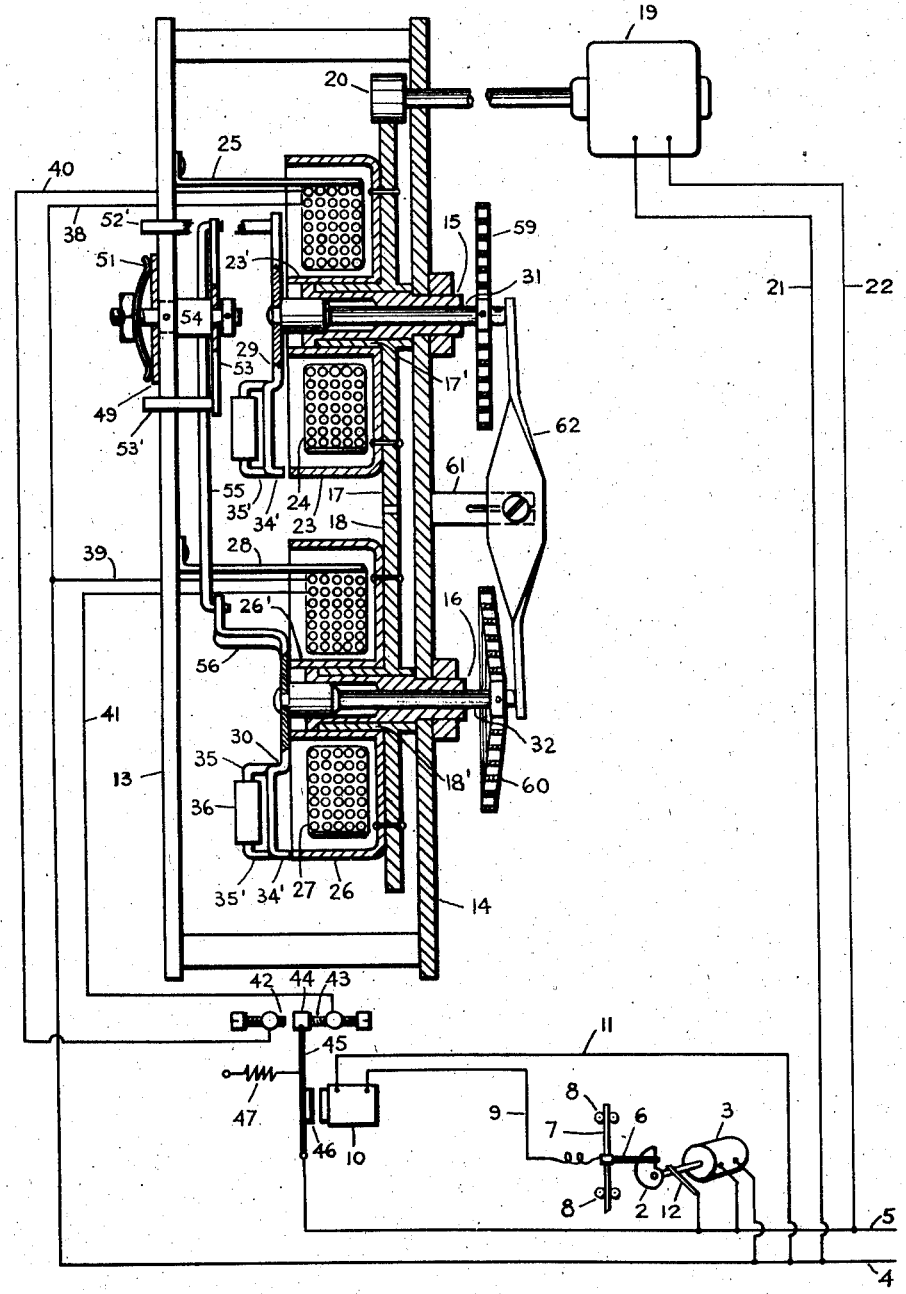
Fig. 1 is a view, partly in vertical section and partly in side elevation, illustrating an embodiment of the invention.

Referring to the drawings, the invention is shown in connection with a telemetric receiver, connected to an alternating current circuit which includes a transmitter of any suitable or well known type. Said transmitter, as shown, may comprise a cam 2 which is continuously rotated at substantially constant speed by a synchronous motor 3 connected to the alternating current mains 4 and 5. A contactor 6, engageable by the face of said cam during each cycle of rotation of the latter, is carried by a rod 7, vertically movable between pairs of guide rollers 8; said rod being positioned, either manually or automatically, in accordance with values of a quantity such, for example, as pressure, temperature, or flow rate of a liquid. The contactor 6 is connected by wire 9 with one terminal of relay magnet 10, the other terminal of which is connected by wire 11 with the main 4. Current from main 5 is led to the cam 2 through brush 12.

It will thus be seen that in each cycle of rotation of the transmitter cam 2 a circuit is closed through the relay magnet 10 for a time proportional to the duration of engagement between said cam and the contactor 6, or, in other words, for a time corresponding to the value of the quantity in accordance with which said contactor is positioned. During the remainder of the cycle of rotation of said cam, said magnet 10 is de-energized.

The receiver apparatus is shown as comprising a suitable frame 13 in the rear panel 14 of which are mounted a pair of bearing sleeves 15, 16. Journaled on said bearing sleeves are a pair of intermeshing gears 17, 18, respectively. Said gears are rotated continuously at substantially constant speed, and in opposite directions, by synchronous motor 19, through a pinion 20 which engages the gear 17. Motor 19 is connected by wires 21, 22 with the alternating current mains 4, 5.

Secured to the gear 17 is a shell or casing 23, which has a bearing portion 23' fitted over a hub 17' of said gear and also over a front end flange of the sleeve 15, as shown. Within said shell is a stationary coil 24, supported in any suitable way, as by a bracket 25 fastened to the frame 13.

A similar shell 26 is secured to gear 18 and has a bearing portion 26' fitted over hub 18' of said gear and over the front end flange of sleeve 16. A stationary coil 27 is supported within said shell 26 in any convenient way, as through a bracket 28 secured to said frame 13. The brackets 25, 28 are of insulating material, although they may be of metal and suitably insulated from the frame 13.

Armatures 29, 30 cooperate with the respective coils 24, 27, and are movable upon energization of said coils into engagement with the corresponding shells 23, 26, so as to rotate with the respective gears 17 and 18. The armature 29, as shown, is fastened to a rod or spindle 31 which extends through, and is slidably supported in, the sleeve 15. Similarly, the armature 30 is fastened to the rod or spindle 32, projecting through and slidably mounted in the sleeve 16. Said spindles 31 and 32 preferably engage within said sleeves with a somewhat loose fit to facilitate seating of each armature against the adjacent shell without being restricted by a tight fit of the spindle in the sleeve.

The shells 23 and 26, gears 17 and 18, hubs 17' and 18', sleeves 15 and 16, and spindles 31 and 32 are of magnetic material providing paths for magnetic flux through the respective armatures 29 and 30 when the corresponding coils are energized. The armatures are likewise of magnetic material (excepting for certain non-magnetic inserts hereinafter described), so that upon energization of either of said coils the armature associated therewith is drawn into firm engagement with the corresponding shell and rotates therewith throughout the period of energization of said coil.

Each armature (Figures 2 and 4) comprises a main body portion, one end of which is slotted, at 33, 33, to provide three separate paths for the magnetic flux, i. e., through the side prongs 34, 34, and the central portion 35 of said slotted end. Said central portion 35 is offset with respect to said prongs 34, 34, and carries a shading coil 36, which retards the building up of the magnetism in said central portion so that the magnetism therein is out of phase with that in the prongs 34, 34, so that magnetic flux is continuously present in the armature during energization of the associated coil 24 or 27, regardless of the alternations of the current. As shown, the projections 34, 34, and 35 are offset slightly outwardly with respect to the main or body portion of the armature, and have lips 34', 34' and 35' extending inwardly at their free ends.

Between the lips 34', 34', of prongs 34 and the lip 35' of the central portion 35, there are interposed a pair of inserts 37, 37, of non-magnetic material, such as brass or copper, which may be silver soldered in place. I have found that the provision of these inserts, which physically tie together the portions 34, 34 and 35, eliminate undesirable noise which occurs when said portions are entirely free at their ends and which appears to be caused by each of such parts vibrating against the edge of the shell as its magnetism alternates. With said inserts, however, the armature, when attracted, rests quietly against the edge of the shell.

It will be further observed that each armature is of what may be termed "single-ended" construction. That is, instead of extending the armature across the entire diameter of the shell so as to bear against the outer rim of said shell at diametrically opposed points, the armature extends over only a portion of the shell diameter and bears at only one end against said outer rim. This is of distinct advantage, since I have found that it obviates the noise which ensues when the armature extends across the entire diameter of the shell, in which case it is difficult to assure that the armature bears equally against the opposite portions of the outer rim at the same time that it bears against the central bearing sleeve 23' or 26' of said shell. With the construction shown, the armature can bear readily against said bearing sleeve at the same time that one end of said armature bears against the outer rim of the shell, which is entirely adequate for causing rotation of the armature with the shell and associated gear, while at the same time objectionable noise is avoided without the necessity of attempting to provide a perfect fit between the armature and opposite portions of the outer rim.

Each of the magnet coils has a terminal connected to the main 4, by wires 38 and 39 respectively. The opposite terminals of said coils are connected, by wires 40, 41, to a pair of contacts 42, 43. The latter are engageable alternately by a contact 44 carried by a blade 45 having an armature 46, said contact and blade being connected to the current main 5. When the magnet 10 is energized in each cycle of rotation of the transmitter cam 2, the armature 46 is attracted and contact 44 is engaged with contact 43, thereby energizing the magnet coil 27 and causing the armature 30 to engage the shell 26. When, on the other hand, said magnet 10 is de-energized, the blade 45 is retracted by spring 47, bringing contact 44 into engagement with contact 42, de-energizing coil 26 and energizing coil 24, with consequent attraction of armature 29 into engagement with shell 23.

The rotation of the armatures 29 and 30 with the corresponding gears 17 and 18 is adapted to position an element, such as an indicator or controlling member, in accordance with the quantity values corresponding to the transmitted signals. While said element might, for example, be in the form of a recording pen, or a member for operating a valve, such element is here shown for illustrative purposes as an indicator 48 having a hub 49 pivoted on the front frame 13, and movable along a suitable scale 50. The pivotal axis of said indicator 48, as shown, is coaxial with that of the armature 29 on the rod 31. A resilient washer 51 (Fig. 1) bears against said hub 49 and maintains the element 48 frictionally in the position to which it is moved under control of the armatures 29 and 30.

An arm 52 extends from the armature 29 and carries a lateral projection 52' which extends into a position overlying the indicator 48. Similarly, an arm 53, pivotally mounted on a block 54 coaxially with the pivot of said indicator 48, carries a lateral projection 53' which extends beneath said indicator; said arm 53 being connected by link 55 with an arm 56 which extends from the armature 30.

It will be noted that the center of gravity of each armature 29 and 30 is not in its axis of rotation, so that, when either armature is released by de-energization of its associated clutch coil 24 or 27, said armature may be returned by gravity to its rest or zero position, in which it engages a stop screw 57 or 58 (Fig. 2). I have, however, provided spring means for supplementing the action of gravity and imparting a more rapid and positive action to restore said armatures to said positions, To this end, each of the rods or spindles 31 and 32 to which the respective armatures 29 and 30 are secured, has connected to its rear end a corresponding one of a pair of spiral springs 59, 60. Spring 59 tends to turn the shaft 31 and armature 29 counter-clockwise as viewed in Figure 2, to restore said armature into engagement with stop screw 57. Spring 60, on the other hand, urges the rod 32 and armature 30 clockwise in Figure 2, to restore said armature into engagement with stop screw 58.

Pivoted on a bracket 61 at the rear of the frame 14 is a walking beam 62, opposite ends of which are engageable by the respective spindles 31 and 32. When, for example, the armature 30 is attracted into engagement with the shell 26, the spindle 32 acts upon the adjacent end of the beam 62 to throw said end outwardly, thereby rocking the upper end of said beam inwardly to thrust the spindle 31 in the corresponding direction and insure positive disengagement of armature 29 from shell 23. The pivot for said walking beam may comprise an eccentric screw 63, enabling the attainment of a very fine adjustment of said beam in relation to the rods or spindles 31, 32.

From the foregoing description, it will be apparent that in each cycle of rotation of the transmitter cam 2 the magnet coil 27 is energized for the period of engagement between said cam and the contactor 6, or, in other words, for a time corresponding to the quantity value represented by the position of said contactor. The clutch armature 30 is engaged with shell 26 and rotates with gear 18 for this same period, said armature turning counter-clockwise from its zero position in Figure 2 and moving the projection 53' upwardly into a position corresponding to said quantity value. If the pointer 48 indicates a reading lower than said value, said projection 53', during its upward movement, encounters said pointer 48 and moves the latter upwardly until it arrives at a position indicating said value. If, on the other hand, said indicator designates a higher value, the projection 53' moves idly without shifting the indicator. If said pointer indicated the proper value prior to said upward movement of said projection 53' the latter simply engages said pointer at the end of said upward movement, without disturbing the pointer.

When, now, the cam 2 moves out of engagement with the contactor 6, the coil 27 is de-energized and coil 24 is energized. Armature 29 is now engaged with shell 23 and rotates clockwise from its zero position in Figure 2, moving the arm 52 and projection 52' downwardly throughout the period in which said cam and contactor are out of engagement. When said armature 29 is drawn into engagement with said shell 23, the rod 31 is shifted rearwardly, actuating the walking beam 62 to thrust the rod 32 forwardly and thereby positively disengaging the armature 30 from shell 26, whereupon said armature 30, together with projection 53', is restored to its zero position by gravity, assisted by spring 60. The projection 52' moves downwardly until the coil 27 is again energized, and if the pointer 48 indicates a reading higher than the value corresponding to the position of the contactor 6, said projection will engage said pointer and move it downwardly until said pointer indicates the proper value. On the other hand, if said pointer is already at the proper value, the projection 52' simply engages said pointer at the end of said downward movement, without moving the pointer.

When the cam 2 next engages the contactor 6, the coil 24 is de-energized and coil 27 is again energized, attracting armature 30 into engagement with shell 26 and actuating the walking beam 62 through spindle 32 to throw the armature 29 positively out of engagement with shell 23, whereupon said armature, together with projection 52', is restored to its zero position by gravity, assisted by spring 59. The cycle above described, is now repeated, the respective projections 52' and 53' moving alternately in opposite directions and through complemental extents. If contactor 6 remains in the same position as in the preceding cycle, said projections merely engage said pointer at the ends of their movements without moving the pointer. But if the position of said contactor has changed the pointer is shifted by one or the other of said projections to designate the correct higher or lower value.

It will be seen that the respective coils 24, 27, and their armatures 29, 30, constitute magnetic clutch elements whereby the indicator positioning arms 52, 53 are operated alternately by the gears 17, 18, in opposite directions and through complemental extents, in each cycle of rotation of the transmitter cam 2. By my invention not only is the element 48 positioned positively and precisely in accordance with the quantity values transmitted, but objectionable noise and chattering are obviated despite the generally desirable employment of alternating current.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An armature for an alternating current electromagnet, said armature comprising a member having at one end a central projection, a pair of other projections at opposite sides of said central projection, said projections providing separate paths for magnetic flux, each of said projections having a lip at its free end, said central projection being offset with relation to said side projections and carrying a shading coil, and inserts of non-magnetic metal positioned between the lips of said projections for tying the same together.

2. In combination, a driving member, a driven member, electromagnetic clutch means for connecting said members, said clutch means comprising a rotatable shell connected to said driving means and an armature connected to said driven means and engageable with said shell, said armature being of less length than the diameter of said shell, said armature furthermore being slotted to provide a plurality of paths for magnetic flux and having a shading coil around one of said paths.

3. In combination, a driving member, a driven member, and electromagnetic clutch means for connecting said driven member to said driving member, said clutch means comprising a rotatable element connected to said driving member, a stationary exciting winding adjacent said rotatable element and an armature connected to said driven member and engageable with said element, said armature comprising a member providing a plurality of paths for magnetic flux and having a shading coil around one of said paths.

4. In combination, a driving member, a driven member, and electromagnetic clutch means for connecting said driven member to said driving member, said clutch means comprising a rotatable shell connected to said driving member, a stationary exciting winding within said shell, and an armature connected to said driven member and engageable with said shell, said armature comprising a member providing a plurality of paths for magnetic flux and having a shading coil around one of said paths.

5. In combination, a driving member, a driven member, electromagnetic clutch means for connecting said members, said clutch means comprising a rotatable shell connected to said driving member, a stationary exciting winding adjacent said shell, and an armature connected to said driven member and engageable with said shell, said armature being of less length than the diameter of said shell, said armature furthermore being slotted to provide a plurality of paths for magnetic flux and having a shading coil around one of said paths.

IRVING O. MINER.